US012809290B2

(12) United States Patent
Kojima et al.

(10) Patent No.: US 12,809,290 B2
(45) Date of Patent: Nov. 24, 2026

(54) DEVELOPING DEVICE HAVING DEVELOPER CARRYING AND IMAGE FORMING APPARATUS

(71) Applicant: CANON KABUSHIKI KAISHA, Tokyo (JP)

(72) Inventors: Katsuhiro Kojima, Tokyo (JP); Hiraku Sasaki, Shizuoka (JP); Kentaro Kawata, Shizuoka (JP); Kohei Matsuda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/047,835

(22) Filed: Feb. 7, 2025

(65) Prior Publication Data

US 2025/0181009 A1 Jun. 5, 2025

Related U.S. Application Data

(63) Continuation of application No. PCT/JP2023/025051, filed on Jun. 29, 2023.

(30) Foreign Application Priority Data

Aug. 22, 2022 (JP) ................................ 2022-131522

(51) Int. Cl.
*G03G 15/08* (2006.01)
*G03G 21/18* (2006.01)

(52) U.S. Cl.
CPC ..... *G03G 15/0812* (2013.01); *G03G 15/0808* (2013.01); *G03G 15/0817* (2013.01); *G03G 21/1814* (2013.01)

(58) Field of Classification Search
CPC ........... G03G 15/0808; G03G 15/0812; G03G 15/0817; G03G 21/1814
See application file for complete search history.

(56) References Cited

U.S. PATENT DOCUMENTS 7,711,279 B2 5/2010 Matsuda et al.
9,069,312 B2 6/2015 Kanai et al.
(Continued)

FOREIGN PATENT DOCUMENTS

JP S59-231570 A 12/1984
JP H05-257376 A 10/1993
(Continued)

OTHER PUBLICATIONS

PCT International Search Report dated Jul. 27, 2023, in related PCT Application No. PCT/JP2023/025051 (with partial English translation).

*Primary Examiner* — Hoang X Ngo
(74) *Attorney, Agent, or Firm* — VENABLE LLP

(57) ABSTRACT

A developing device includes a developer carrying member having a surface carrying a developer and that includes a conductive portion and a dielectric portion and capable of carrying the developer by a micro electric field formed on the surface including the conductive portion and the dielectric portion, a frame to rotatably support the developer carrying member and including a developing container which accommodates the developer, and a regulating member of which one end portion is a fixed end fixed to the frame and the other end portion is a free end with respect to a short hand direction perpendicular to a longitudinal direction which is a direction parallel to a rotational axis direction of the developer carrying member. No supplying roller supplies the developer toward the developer carrying member, and the regulating member contacts the developer carrying and regulates a thickness of a developer layer.

6 Claims, 11 Drawing Sheets

(56) References Cited

U.S. PATENT DOCUMENTS

| | | | |
|---|---|---|---|
| 9,152,076 | B2 | 10/2015 | Nishida |
| 12,092,970 | B2 | 9/2024 | Matsuda et al. |

FOREIGN PATENT DOCUMENTS

| | | | | | |
|---|---|---|---|---|---|
| JP | H06-130792 | | | 5/1994 | |
| JP | 2012-159828 | | | 8/2012 | |
| JP | 2013109073 | A | * | 6/2013 | ............ G03G 15/08 |
| JP | 2020-013111 | A | | 1/2020 | |

* cited by examiner

DEVELOPING DEVICE HAVING DEVELOPER CARRYING AND IMAGE FORMING APPARATUS

TECHNICAL FIELD

The present invention relates to a developing device in an image forming apparatus such as an electrophotographic printer and an electrophotographic copy machine, which form an image on a recording material.

BACKGROUND ART

Conventionally, a developing device, which is constituted by a developing member which develops an electrostatic latent image formed on a photosensitive member with developer, a supplying member which supplies the developer to the developing member, a regulating member which regulates a layer thickness of the developer on the developing member, a developer container which accommodates the developer, etc., is widely known. In such a configuration of the developing device, a supplying roller as the supplying member contacts a developing roller as the developing member with a certain penetrating amount, is rotated in the same direction as the developing roller, and supplies the developer accommodated in the developer container to the developing roller.

In Japanese Patent Publication Laid-Open No. H06-130792, it is disclosed that a configuration of a developing device, which does not include a supplying roller but includes a developing roller, which is configured so that, on a surface of the developing roller, a dielectric portion which is capable of holding an electric charge and a conductive portion which is grounded are mixed and exposed with micro areas. In the configuration of Japanese Patent Application Laid-Open No. H06-130792, by electric charge being applied, an electric field is formed on the dielectric portion, and by gradient force of this electric field, it becomes possible for the developing roller to carry developer.

SUMMARY OF THE INVENTION

Problem to be Solved by the Invention

In the configuration of the developing device disclosed in Japanese Patent Application Laid-Open No. H06-130792, in order to increase an adhesion amount of the developer on the developing roller, a mini-agitator is provided separately to prevent agglomeration of the developer near the surface of the developing roller and to convey the developer onto the developing roller. For a developing device which does not include a supplying roller, there has been a need to simplify a configuration by not providing the mini-agitator, etc.

An object of the present invention is, in a developing device which does not include a supplying member which supplies developer by contacting a developing member, to provide a developing device which can carry the developer onto the developing member with a simple configuration.

Means for Solving the Problem

According to the present invention, there is provided a developing device comprising: a developer carrying member of which a surface carrying a developer is configured to include a conductive portion and a dielectric portion and capable of carrying the developer by a micro electric field formed on the surface including the conductive portion and the dielectric portion; a frame configured to rotatably support the developer carrying member and constituting a developing container which accommodates the developer; and a regulating member of which one end portion is constituted as a fixed end fixed to the frame and of which the other end portion opposite to the one end portion is constituted as a free end with respect to a short hand direction perpendicular to a longitudinal direction which is a direction parallel to a rotational axis direction of the developer carrying member, wherein the regulating member contacts the developer carrying member in a state in which a tip portion of the free end faces a downstream side in a rotational direction of the developer carrying member and regulates a thickness of a layer of the developer carried on the developer carrying member to a predetermined thickness, and wherein when an axis which passes through a rotation center of the developer carrying member and faces a direction opposite to a direction of gravity is a Y-axis and an axis which passes through the rotation center and rotates the Y-axis by 90° in a clockwise direction is an X-axis, in a coordinate system in which a rotational direction of the developer carrying member is a counterclockwise direction, the tip portion and the fixed end are disposed in a second quadrant of the coordinate system.

Effect of the Invention

According to the present invention, in a developing device which does not include a supplying member which supplies developer by contacting the developing member, it becomes possible to provide a developing device which can carry the developer onto the developing member with a simple configuration.

EMBODIMENTS FOR CARRYING OUT THE INVENTION

Hereinafter, with reference to the drawings, modes for practicing the present invention will be exemplarily described in detail based on embodiments. However, dimensions, material and shapes of components, relative arrangement thereof, etc. described in the present embodiments are what may be changed appropriately according to configurations of an apparatus to which the present invention is applied and various conditions. In other words, it is not intended to limit the scope of the present invention to the modes of practice described below.

Embodiment 1

Image Forming Apparatus

Figure 1:
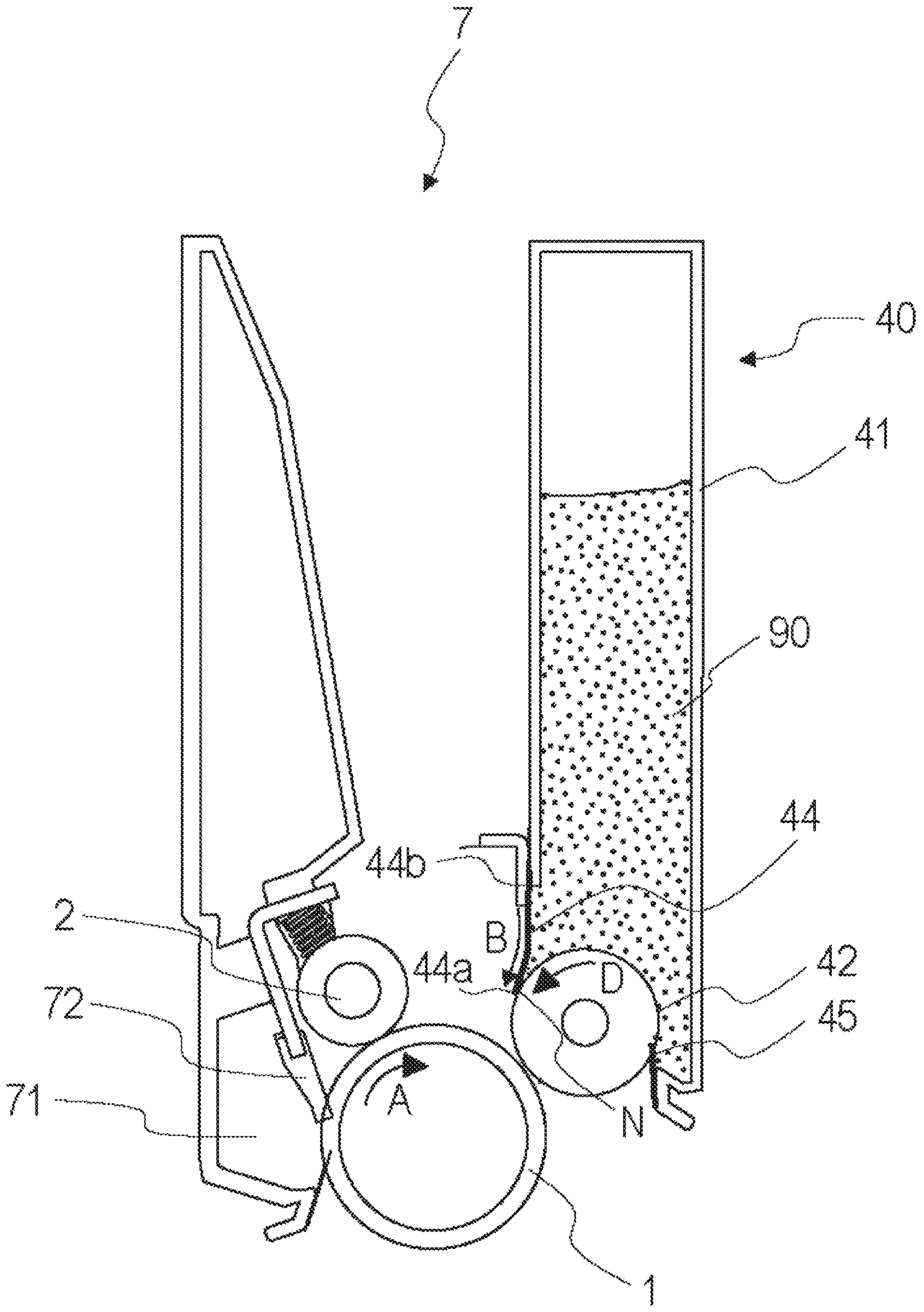
FIG. 1 is a cross-sectional outline view of a process cartridge according to an Embodiment 1.
Figure 2:
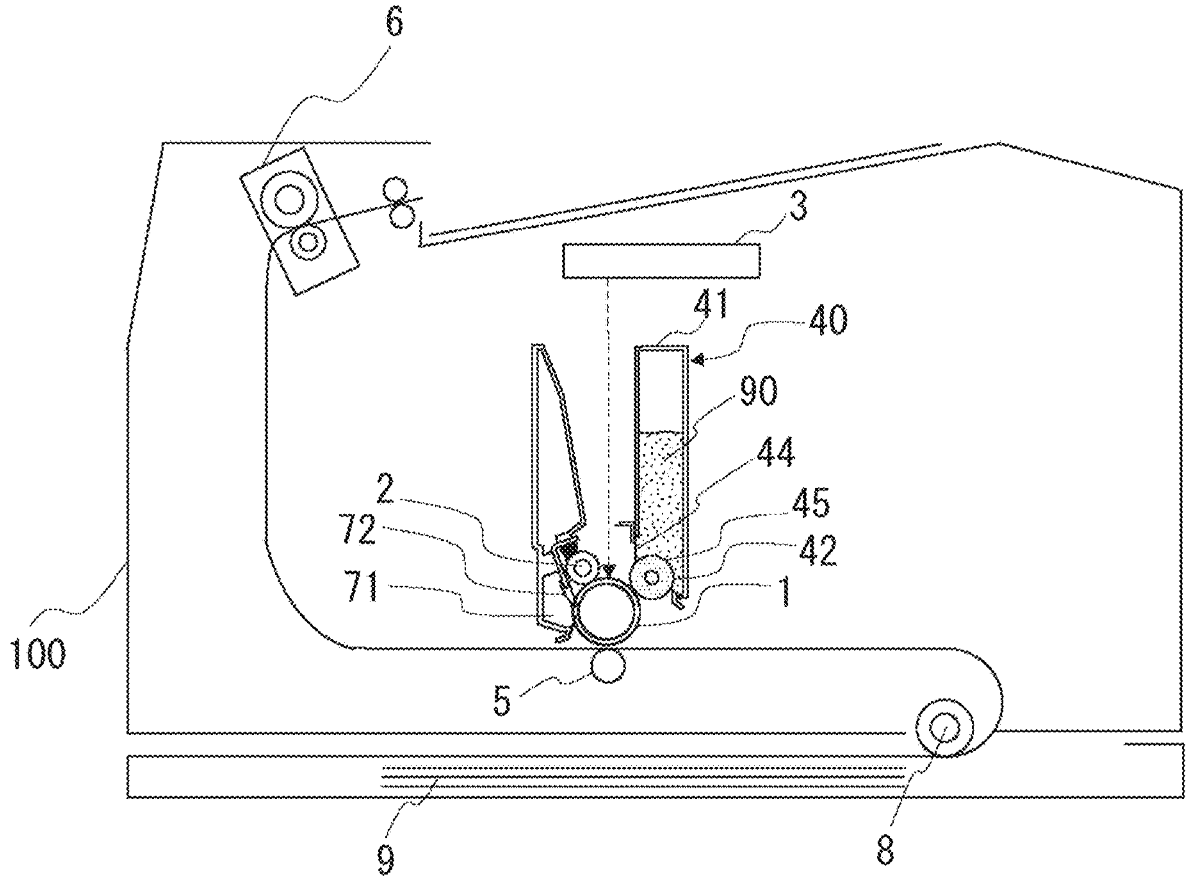
FIG. 2 is a cross-sectional outline view of an image forming apparatus according to the Embodiment 1.

FIG. 2 is a schematic cross-sectional view illustrating a configuration of a laser beam printer, which is an example of an image forming apparatus 100 according to embodiments of the present invention. FIG. 1 is a cross-sectional view of a process cartridge 7, in which a photosensitive drum 1 as an image bearing member, a charging device 2, a developing device 40, and a cleaning blade 72 are integrated into a cartridge and which is mountable to and demountable from the image forming apparatus 100.

As shown in FIG. 2, to the image forming apparatus 100 according to the present embodiment, the photosensitive drum 1 of cylindrical shape as the image bearing member is provided so as to be rotated in one direction (direction of an arrow A in FIG. 1) about an axis thereof. After a surface of the photosensitive drum 1 is uniformly charged by the charging device 2, a latent image is formed by an exposure device 3. In addition, the developing device 40 according to the present embodiment includes a frame 41, which constitutes a developing container for accommodating toner 90 as a non-magnetic one-component developer, and visualize the electrostatic latent image as a toner image by supplying the toner 90 to the electrostatic latent image on the photosensitive drum 1. In this manner, the toner image on the photosensitive drum 1, which is visualized by the toner 90, is transferred to a recording material 9 by a transfer device 5. The recording material 9 is fed by a feeding roller 8 and conveyed by a registration roller (not shown) to the transfer device 5 in synchronization with move of the toner image on the photosensitive drum 1. And the visible image by the toner 90 transferred to the recording material 9 is conveyed to a fixing device 6 together with the recording material 9, fixed by heat or pressure, and fixed onto the recording material 9 as a recording image. On the other hand, the toner which remains on the photosensitive drum 1 without being transferred after the transfer is removed by the cleaning blade 72 and accommodated in a waste toner container 71. After that, the surface of the photosensitive drum 1 is charged again by the charging device 2 and the process described above is repeated.

Configuration of the Developing Device

Next, the developing device 40 in the present embodiment will be described using FIG. 1. As shown in FIG. 1, in the developing device 40, an opening portion extending in a longitudinal direction is provided to the frame 41, and the developing roller 42 (developing member) as a developer carrying member is provided rotatably so as to cover the opening portion. The developing roller 42 is supported by the frame 41 in a rotatable state. In addition, at a position corresponding to the opening portion of the developing device 40 and different from a position, at which the regulating blade 44 described below is provided, with respect to a rotational direction of the developing roller 42, a flexible sheet 45 (sealing member) is provided to the frame 41. The flexible sheet 45 prevents the toner 90 from leaking from a gap between the opening portion of the frame 41 and the developing roller 42.

The developing device 40 includes the regulating blade 44 as a regulating member. The regulating blade 44 is provided at a position opposing to the developing roller 42 and, by making a thickness of the toner layer on the developing roller 42, which is conveyed to a developing area, which is an opposing portion to the photosensitive drum 1, is regulating the thickness of the toner layer carried by the developing roller 42 to a predetermined thickness. In addition, as described below, the regulating blade 44 also includes an electric charge applying means which applies predetermined electric charge to a dielectric portion 31 on the developing roller 42 and a function to apply predetermined electric charge to the toner 90.

The developing device 40 in the present embodiment has a configuration in which a toner supplying member (conveying member for conveying the toner toward the developing roller 42) to be provided inside the developing container is omitted. In the configuration of the developing device 40 in the present Embodiment, in order to carry a plurality of layers of the toner on the surface of the developing roller 42, gradient force generated by a microfield described below is utilized.

Description of the Developing Roller

Figure 3:
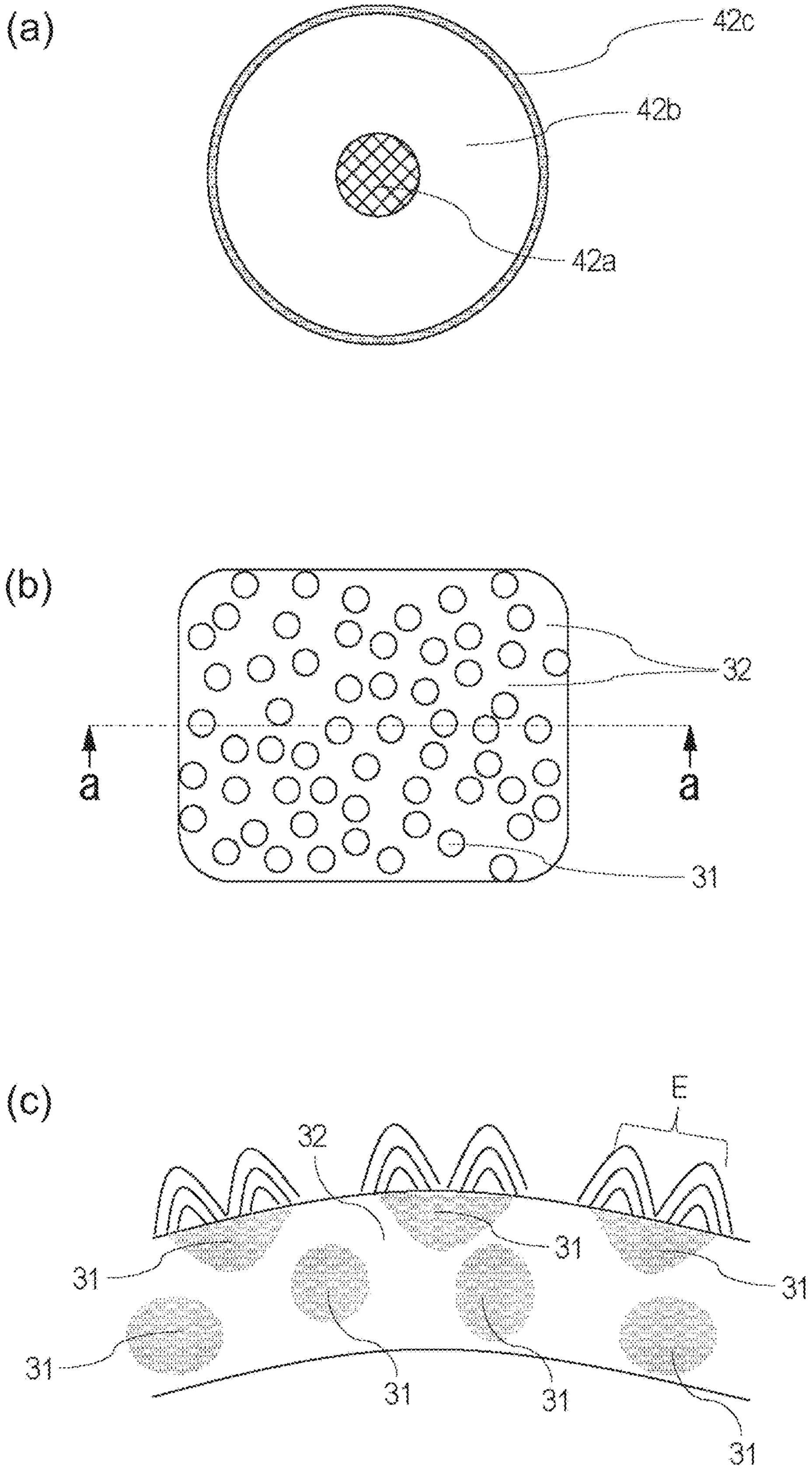
FIG. 3, part (a), part (b) and part (c), includes schematic views illustrating a configuration of a developing member in the Embodiment 1.

Next, the developing roller 42 in the present invention will be described using FIG. 3. As shown in FIG. 3, as the developing roller 42 in the present embodiment, a roller, whose surface for carrying the toner 90 is constituted by a conductive portion and the dielectric portions, is used. In more detail, the developing roller 42, which is constituted so that a plurality of the dielectric portions capable of holding electric charge are scattered and exposed with micro areas on a surface constituted by the conductive portion (on the conductive portion), is used.

As shown in part (a) of FIG. 3, the developing roller 42 is constituted by an elastic layer 42*b*, which is constituted by conductive rubber material, and a surface layer 42*c* on an outer periphery of a shaft core 42*a* (rotation shaft 42*a*). The developing roller 42 having the configuration can be manufactured by forming the surface layer 42*c*, which is constituted by conductive resin material with dielectric particles dispersed, on the elastic layer 42*b* by coating, etc., for example, and polishing the surface thereof.

A plan view of the surface layer 42*c* of the developing roller 42 is shown in part (b) of FIG. 3, and an a-a cross-sectional view of part (b) of FIG. 3 is shown in part (c) of FIG. 3. By charging the dielectric portion 31 with a prescribed method, micro closed electric fields (microfields) as shown by electric force lines E in part (c) of FIG. 3 are formed. In this manner, the dielectric portion 31 and the conductive portion 32 are provided on the surface of the developing roller 42, the regulating blade 44 rubs the dielectric portion 31 via the toner 90 and charges the dielectric portion 31, and the micro closed electric fields indicated by solid lines E are formed on adjacent portions with the conductive portion 32. By the gradient force generated by the micro electric field, the toner 90 is attracted and carried to the surface of the developing roller 42.

A size of the dielectric portion 31 (size of a circular portion exposed to a peripheral surface of the conductive portion 32) is preferably be configured so that an outer diameter is about, for example, 5 through 500 μm. This is an optimum value to hold the electric charge on the surface and suppress unevenness in an image. In a case in which the outer diameter is less than 5 μm, since a potential amount, which can be held on the surface of the dielectric portion 31, is reduced, sufficient micro closed electric field cannot be formed. In addition, in a case in which the outer diameter is larger than 500 μm, a potential difference between the dielectric portion 31 and the conductive portion 32 increases, resulting in an image with a significant unevenness.

The dielectric portion 31 needs to maintain the micro closed electric field by keeping the potential difference to the conductive portion 32 to some extent while passing through a contact nip N with the regulating blade 44 until reaching the contact nip N again by the developing roller 42 rotating 360°. In addition, in order to form the micro closed electric field shown by the electric force line E in part (c) of FIG. 3, it is desirable that the electric charge held by the conductive portion 32 be smaller. Therefore, in the present embodiment, the dielectric portion 31 and the conductive portion 32 are configured so that a volume resistance value of the dielectric portion 31 is greater than a volume resistance value of the conductive portion 32 and a difference between the volume resistance values is $10^2$ Ωcm or more. Specifically, the volume resistance value of the conductive portion 32 is configured to be $10^{11}$ Ωcm or less, and the volume resistance value of the dielectric portion 31 is configured to be $10^{13}$ Ωcm or more. Incidentally, the volume resistance values described above are measured and obtained in an environment with a room temperature of 23° C. and a humidity of 50%.

In order to form the surface layer 42*c* as shown in part (a) through part (c) of FIG. 3, for example, acrylic resin particles are dispersed in urethane resin as a binder. As conductive material used to apply conductivity to the surface layer 42*c*, carbon black and ionic conductive material can be used in the same manner. In the present embodiment, by configuring a content of the conductive material of the surface layer 42*c* to be 0.20 parts by mass with respect to 100 parts by mass of the urethane resin, a urethane resin portion is configured to function as the conductive portion 32. In addition, for the dielectric portion 31, the acrylic resin particles with an average particle diameter of 30 μm are adopted. In the present embodiment, by configuring the acrylic resin particles to be 70 parts by mass with respect to 100 parts by mass of the urethane resin, as an area ratio of the dielectric portion 31 and the conductive portion 32, it is configured so that an area of the dielectric portion 31 is about 50% of an entire area.

Description of a Configuration of the Regulating Blade

Next, the regulating blade 44 in the present invention will be described using FIG. 1. As shown in FIG. 1, in the regulating blade 44, one of an end portion (one end side) in a short hand direction, which is perpendicular to the longitudinal direction (a direction parallel to the rotational axis direction of the developing roller 42), is fixed to the frame 41 by a fastening portion such as a screw, and the other end portion (other end side) is a free end 44*a*. A direction (direction of an arrow B in the figure), in which the regulating blade 44 extends from a fixed end 44*b*, which is fixed to the frame 41, to the free end 44*a*, which is in contact with the developing roller 42, is, at the contact nip N with the developing roller 42, the same forward direction as the rotational direction of the developing roller 42 (a direction of an arrow D in the figure). In the present embodiment, as the regulating blade 44, a thin plate of SUS having a shape of a plate spring with a free length of 8 mm in the short hand direction and a thickness of 0.08 mm is used. Here, as the regulating blade 44, it is not limited thereto, but a thin sheet of metal such as phosphor bronze and aluminum may be used.

To the developing device 40 in the present Embodiment, a supplying member for supplying the toner to the developing roller 42 by contacting the developing roller 42 is not provided. In the developing device to which the supplying member is not provided, there is a concern that image defect (hereinafter referred to as a "solid followability defect") may occur due to a toner supply amount to the developing member becomes insufficient upon performing a printing of a high printing such as an image of which print ratio on the recording material is 100% (hereinafter referred to as a "solid image"). In the present embodiment, in order to suppress the solid followability defect, the free end 44*a* of the regulating blade 44 is disposed so as to face the same forward direction as the rotational direction of the developing roller 42 (D direction). In other words, in the present embodiment, a tip portion of the free end 44*a*, which is in contact with the developing roller 42, is disposed and in contact with the developing roller 42 in a state of facing a downstream side in the rotational direction of the developing roller 42.

Mechanism for Suppressing the Solid Followability Defect

Next, using FIG. 4, mechanism for suppressing the solid followability defect by configuring the free end 44*a* of the regulating blade 44 to be in contact with the developing roller 42 in the forward direction will be described.

Figure 4:
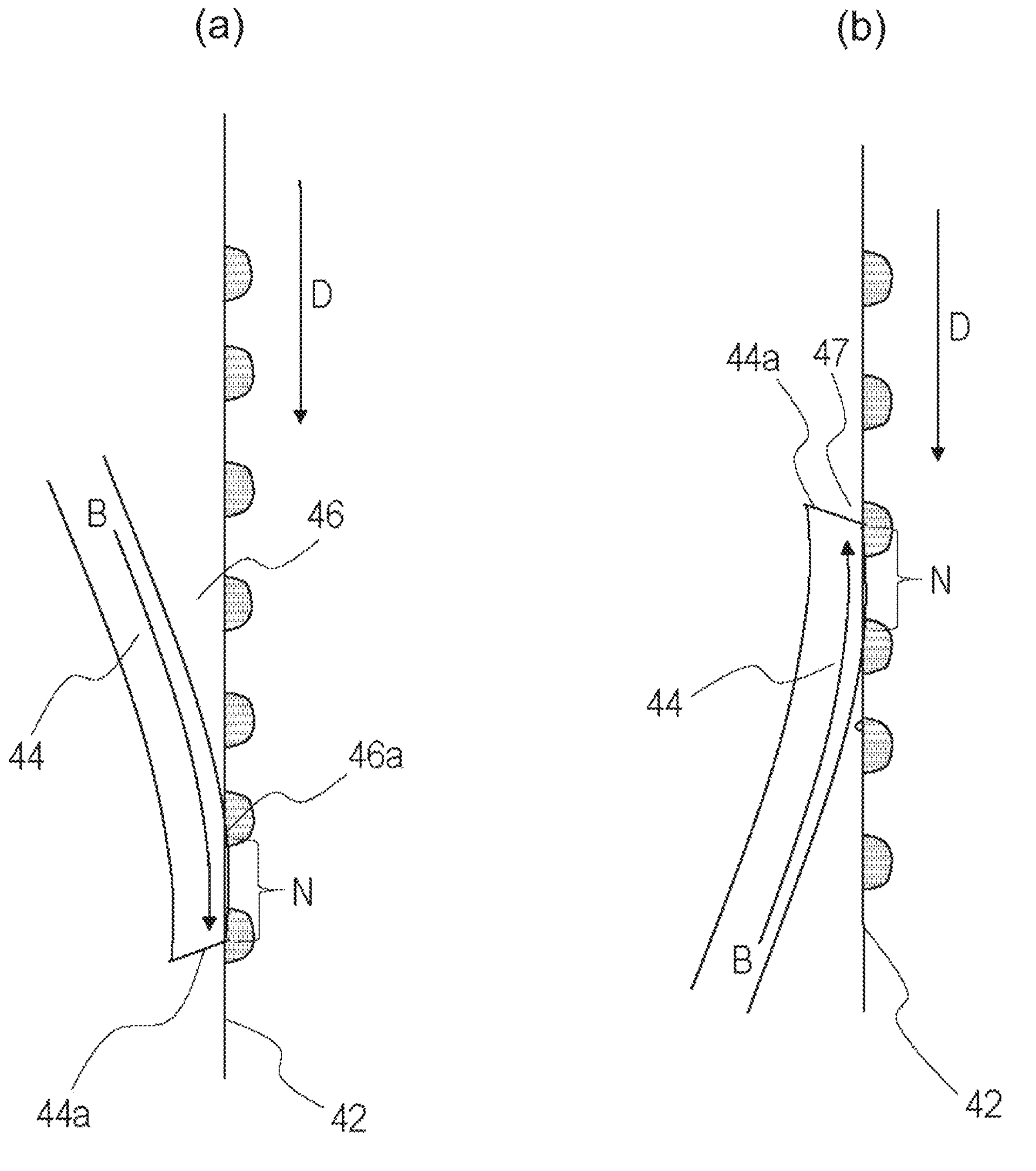
FIG. 4, part (a) and part (b), includes schematic views of a vicinity of a contact nip between the developing member and a regulating member.

Part (a) of FIG. 4 is a schematic view of a vicinity of the contact nip N in a case in which, at the contact nip N, the B direction, which extends from the fixed end 44*b* to the free end 44*a*, and the D direction, which is the rotational direction of the developing roller 42, are the same direction (hereinafter referred to as a forward direction contact). Part (b) of FIG. 4 is a schematic view of the vicinity of the contact nip N in a case in which, at the contact nip N, the direction B, which extends from the fixed end 44*b* to the free end 44*a*, and the direction D, which is the rotational direction of the developing roller 42, are opposing (hereinafter referred to as an opposing contact).

In the case of the forward direction contact, in an upstream portion of the contact nip N as part (a) of FIG. 4 illustrates, a space between the developing roller 42 and the regulating blade 44 is a large space of wedge shape 46. The toner in the space of wedge shape 46 is conveyed toward an upstreammost portion 46*a* of the space of wedge shape 46 by conveyance force due to the rotation of the developing roller and gravity, resulting in the larger toner density. The larger the toner density, the more an opportunity for contact between the toner and the dielectric portion 31, in which the gradient force is stronger, and the toner adhesion amount to the developing roller 42 is increased.

On the other hand, in the case of the opposing contact, a space of wedge shape 47 upstream of the contact nip N is small as part (b) of FIG. 4 illustrates, and the toner density does not get increased as in the forward direction contact. As a result, in the case of the opposing contact, upon performing the printing of the high printing such as a solid image, the toner supply amount to the developing roller 42 becomes insufficient, resulting in the solid followability defect, in which an image density at a trailing end of the sheet becomes lower than the image density at a leading end of the sheet, to occur.

In the forward direction contact, it has been described that, by increasing the toner density in the space of wedge shape 46, insufficient supply of the toner to the developing member is suppressed and the solid followability is improved, and the mechanism thereof will be described using part (a) through part (b) of FIG. 5. Part (a) of FIG. 5 shows a schematic view of the vicinity of the contact nip N when the toner density in the space of wedge shape 46 is large, and part (b) of FIG. 5 shows a schematic view of the vicinity of the contact nip N when the toner density in the space of wedge shape 46 is small.

The dielectric portion 31 on the surface of the developing roller 42, which has a strong microfield, moves in the direction of the arrow D in the figure as the developing roller 42 rotates, plunges into the space of wedge shape 46, in which the toner 90 is accumulated, and rubs against the toner until reaching the upstreammost portion 46*a* of the space of wedge shape 46. In the case in which the toner density in the space of wedge shape 46 is large as in part (a) of FIG. 5, the toner amount, which is rubbed upon passing through the space of wedge shape 46, gets increased.

Figure 5:
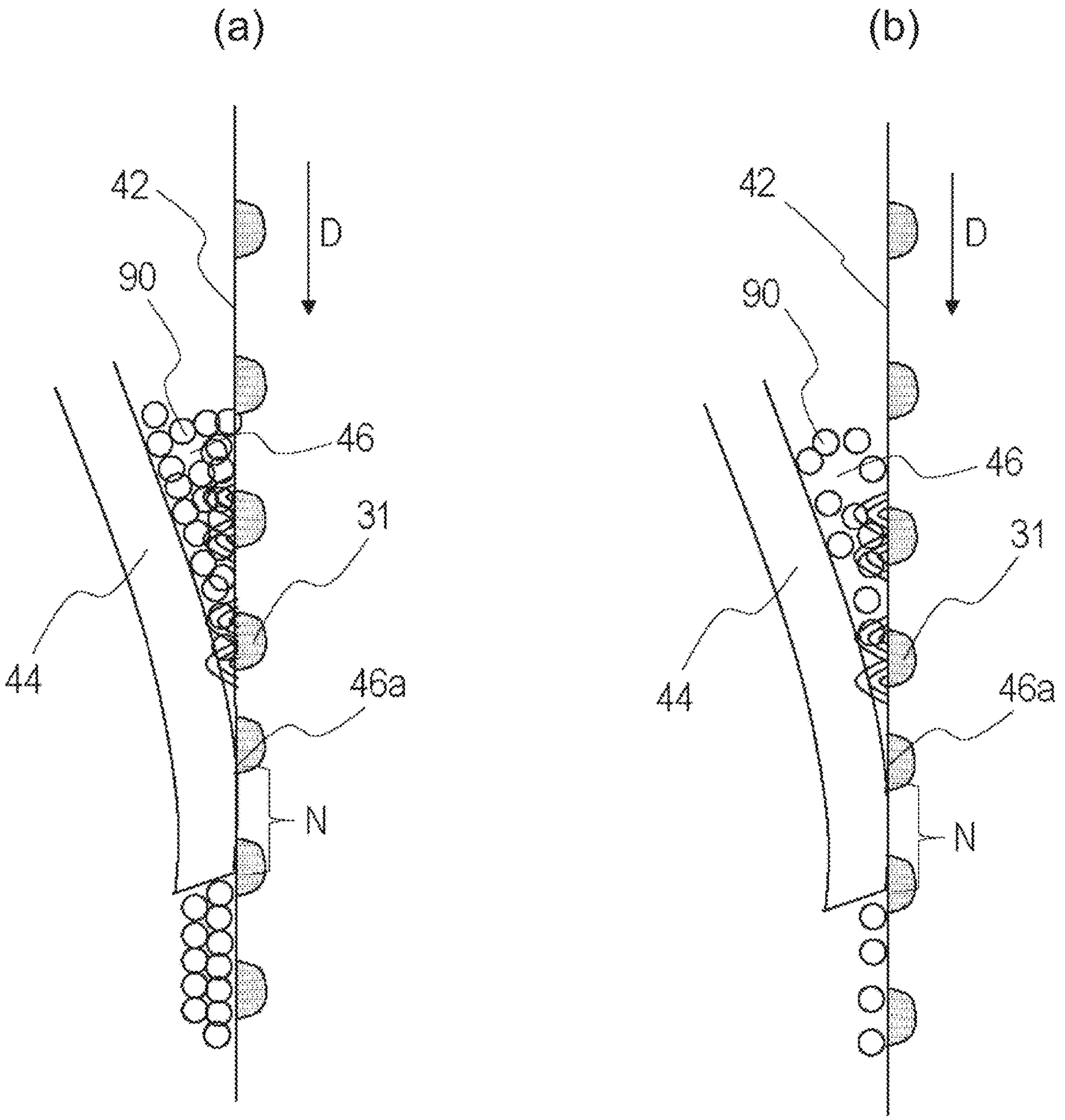
FIG. 5, part (a) and part (b), includes cross-sectional outline views describing a relationship between toner density and solid followability.

Conversely, as the toner density is small as in part (b) of FIG. 5, the amount of the toner 90, which is rubbed, gets decreased. The more the toner amount, which is rubbed, the more the toner amount which is adhered to the dielectric portion 31 due to the gradient force caused by the microfield and can reach the upstreammost portion 46*a* of the space of wedge shape 46. The more the toner amount which can reach the upstreammost portion 46*a* of the space of wedge shape 46, the more the toner amount which can pass through the regulation by the contact nip N, and the toner amount which is developed to the photosensitive drum 1 gets increased. As a result, it becomes possible to suppress the occurrence of the solid followability defect due to the insufficiency in the toner supply amount.

Through diligent study by the present inventors, it is found that the toner density in the space of wedge shape 46 in the forward direction contact is largely affected by a position of the free end 44*a* of the regulating blade 44 and a height of a surface of the toner 90 accommodated in the frame 41. Hereinafter, by changing the position of the free end 44*a* and the height of the toner surface, image evaluation of the solid followability is conducted.

Definition of a Coordinate System for the Free End 44*a* and the Fixed End 44*b*

Figure 6:
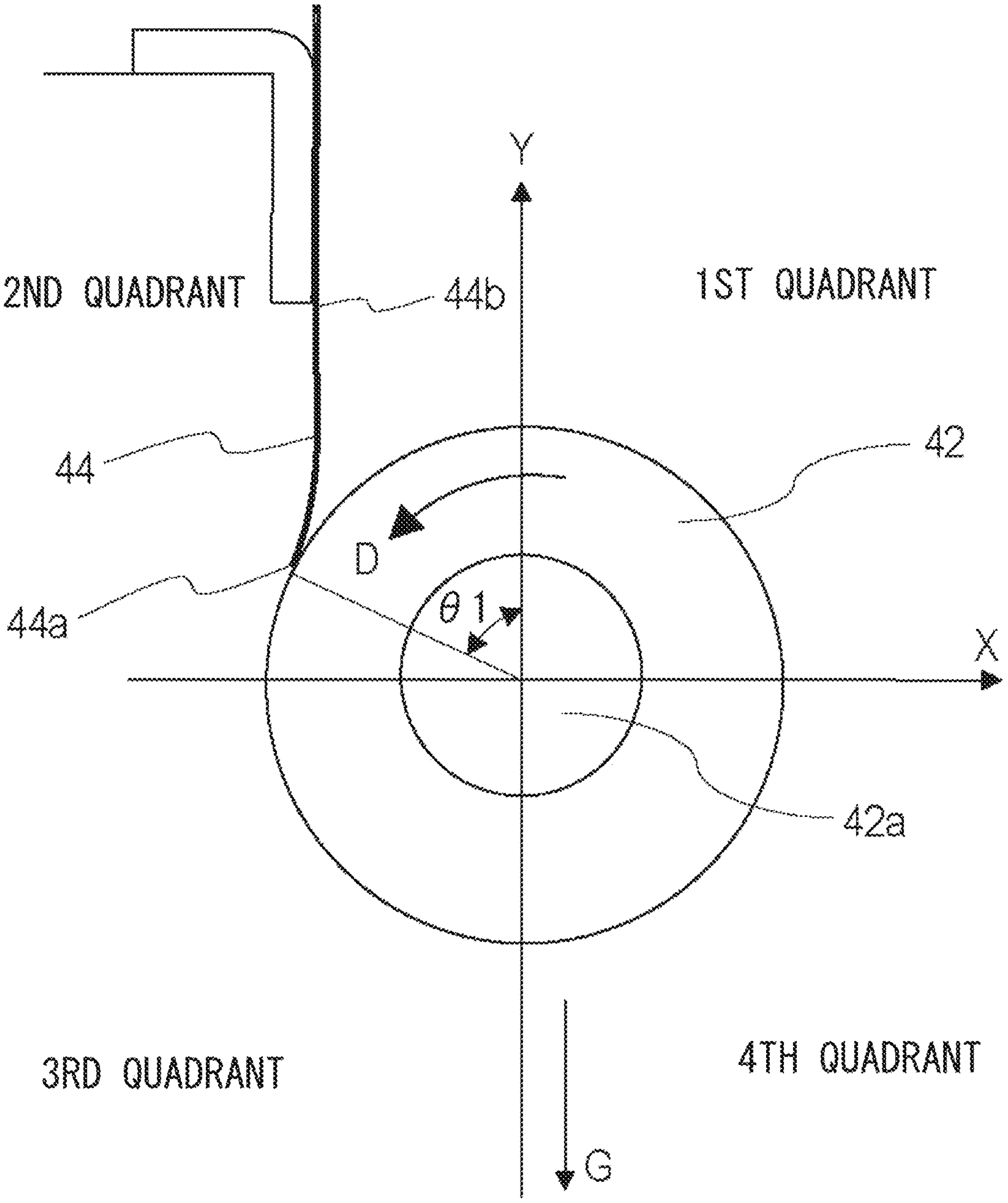
FIG. 6 is a cross-sectional outline view describing a positional relationship between the regulating member and the developing member.

Next, a coordinate system which defines positions of the free end 44*a* and the fixed end 44*b* will be described. FIG. 6 is a schematic view describing a positional relationship between the regulating blade 44 and the developing roller 42. It is assumed that a coordinate system in a cross section perpendicular to the rotation shaft 42*a* (rotational axis) of the developing roller 42 as is shown in FIG. 6. The shown D direction, which is the rotational direction of the developing roller 42, is counterclockwise. In the above cross section, an axis, which is exact opposite direction (opposite direction) to a shown G direction, which is a direction of gravity, and passes through a rotation center of the developing roller 42, is defined as a Y-axis. In addition, an axis, which rotates the Y-axis by 90 degrees clockwise and passes through the rotation center of the developing roller 42, is defined as an X-axis. And an origin is defined as a rotation center O of the developing roller 42, and this coordinate system is a coordinate system in which a center coordinate of the developing roller 42 is (X, Y)=(0, 0).

In addition, an angle between a line connecting the tip portion of the free end 44*a*, which is a position where the regulating blade 44 is in contact with the developing roller 42, and the origin O and the Y-axis is defined as Θ1, and a leftward rotation (counterclockwise) with respect to the Y-axis is defined as a positive angle and a rightward rotation (clockwise) with respect to the Y-axis is defined as a negative angle.

Evaluation Method for the Solid Followability

Next, an evaluation method for the solid followability will be described. A solid image is printed out to a XEROX 4200 sheet of LETTER size (manufactured by XEROX Corporation, 75 $g/m^2$) and ranking for the solid followability is performed. In more detail, the evaluation is performed by using a Macbeth densitometer RD-914 (manufactured by Kollmorgen Instruments Corp.) for the obtained solid images and, based on a value subtracting Macbeth density at the trailing end of the sheet from the Macbeth density at the leading end of the sheet, according to following evaluation references A through D. In the evaluation in the present Embodiment, a rank B or better is determined to be good.

A: Very good (less than 0.05)

B: Good (0.05 or more and less than 0.1)

C: Slight image defect can be seen through visual inspection (0.1 or more and less than 0.2)

D: Image defect can be seen through the visual inspection (0.2 or more)

Effect of the Position of the Free End 44*a* on the Solid Followability

Effect of the angle Θ1, which is considered to significantly affect the toner density in the space of wedge shape 46, on the solid followability is examined. The angle between the tip portion of the free end 44*a*, which is in contact with the developing roller 42, and the origin O of the coordinate system is defined as the angle Θ1. As the evaluation method, in a state in which the shape of the space of wedge shape 46 is maintained, the position of the free end 44*a* is changed. Specifically, as shown in FIG. 7, printing of the solid image is performed with changing an installation angle α of the image forming apparatus 100, and the evaluation of the solid followability is conducted.

Figure 7:
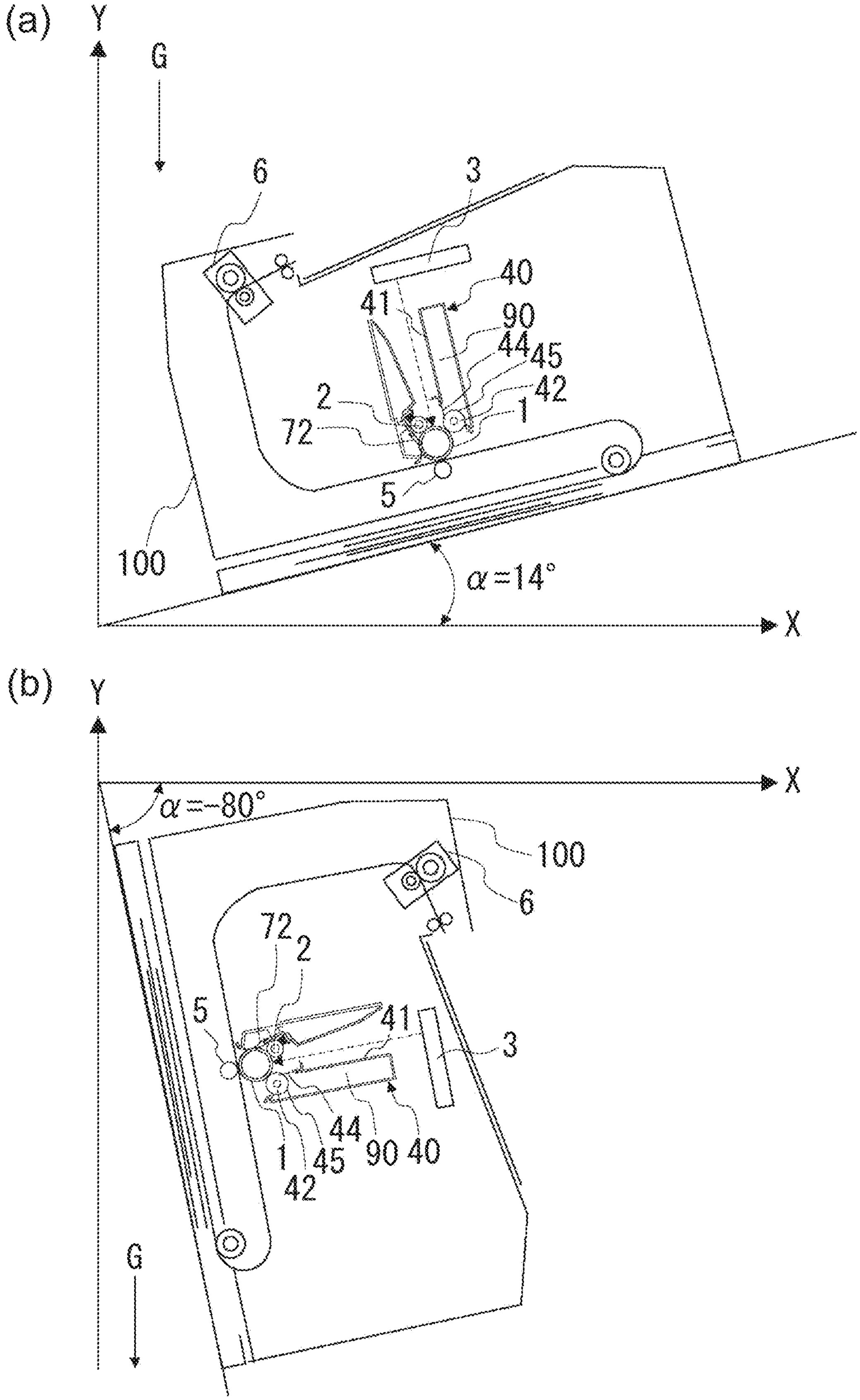
FIG. 7, part (a) and part (b), includes cross-sectional outline views in cases in which the image forming apparatus is tilted.

Part (a) of FIG. 7 is a cross-sectional view of the image forming apparatus 100 in a case in which the installation angle is set to an angle of elevation to increase the angle Θ1 of the free end 44*a*, and is a cross-sectional view of the image forming apparatus 100 when the installation angle α=14°. The angle Θ1 of the free end 44*a* at this time can be made 14° larger than when the image forming apparatus 100 is installed horizontally, and the angle Θ1 is taking a value of 80°.

Part (b) of FIG. 7 is a cross-sectional view of the image forming apparatus 100 when the installation angle is set to an angle of depression to reduce the angle Θ1 of the free end 44*a*, and is a cross-sectional view of the image forming apparatus 100 when the installation angle α=−80°. The angle Θ1 of the free end 44a at this time can be 80° smaller than when the image forming apparatus 100 is installed horizontally, and the angle Θ1 is taking a value of −14°.

In this manner, in the evaluation in the present embodiment, by changing the installation angle α in a range of 14° through −106°, the angle Θ1 of the free end 44a is changed from 80° to −40°, and the evaluation of the solid followability is conducted. Table 1 shows evaluation results of the solid followability.

TABLE 1

Evaluation results of the solid followability

| Angle Θ1 (°) | Rank for the solid followability |
|---|---|
| 80 | A |
| 60 | A |
| 50 | A |
| 45 | A |
| 40 | B |
| 30 | B |
| 10 | B |
| 0 | B |
| −10 | C |
| −20 | C |
| −30 | D |
| −40 | D |

As shown in Table 1, in cases in which the angle Θ1 of the tip portion of the free end 44a has positive values, the solid followability is the rank B or better and good solid images are obtained. On the other hand, in cases in which the angle Θ1 is negative, the solid followability is rank C or worse and sufficient density cannot be obtained at the trailing end of the sheet.

Mechanism by which the solid followability is good in the cases in which the angle Θ1 is positive and the image defect can be found through the visual inspection in the cases of negative will be described using FIG. 8. Part (a) of FIG. 8, part (b) of FIG. 8 and part (c) of FIG. 8 show contact states of the regulating blade 44 when the angle Θ1 is 0°, 80° and −14°, respectively.

Figure 8:
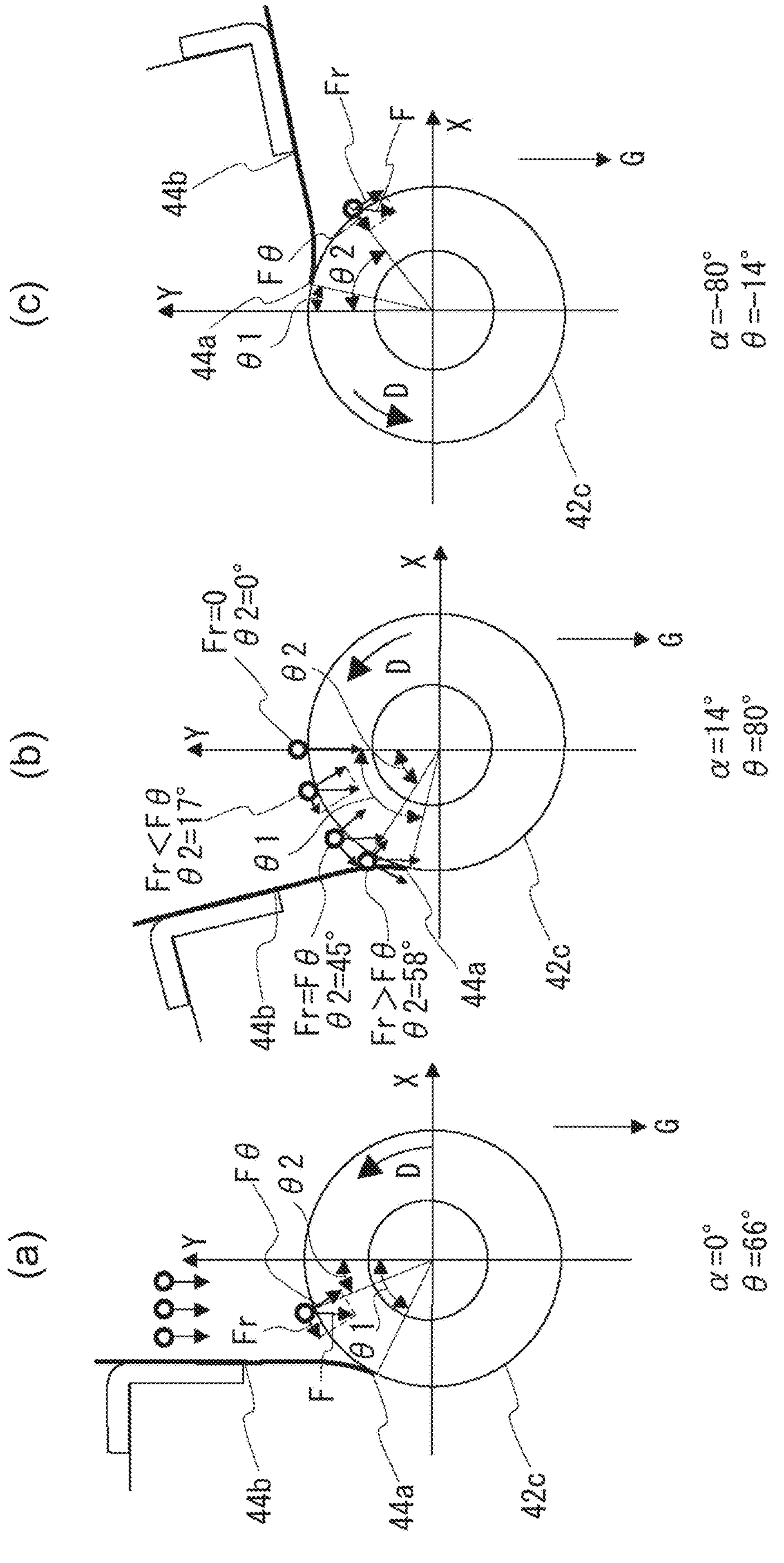
FIG. 8, part (a), part (b) and part (c), includes cross-sectional outline views of a contact state of a regulating blade upon the image forming apparatus being tilted.

In a case of part (a) of FIG. 8, the gravity of the toner, which is present above in the developing device 40, is in a direction supplying to the surface of the developing roller 42. Furthermore, when gravity F acting on the toner on the surface of the developing roller 42 is decomposed into component force Fr in the rotational direction of the developing roller 42 and component force FO in a vertical direction, the component force Fr is in a direction toward the contact nip N. Therefore, by the component force Fr, the toner on the surface of the developing roller 42 is conveyed to the contact nip N, therefore the toner density in the space of wedge shape 46 becomes larger. As a result, in the cases in which the angle Θ1 has positive values, the solid followability is rank B or better, and good solid images can be obtained.

In particular, in cases in which the angle Θ1 is 45° or more, the evaluation results is rank A, and the solid followability is very good. About this will be described using part (b) of FIG. 8. Part (b) of FIG. 8 shows the contact state of the regulating blade 44 when the angle Θ1 is 80°. Here, an angle between a line connecting the toner on the surface of the developing roller 42 and the origin O of the coordinate system and the Y-axis is defined as an angle Θ2. In states of part (b) of FIG. 8, the Θ2s of the four toners on the developing roller 42 are taking values of 0°, 17°, 45° and 58°. For the four toners, as relationships between the component force Fr and the component force FΘ are shown in the figure, the component force Fr becomes larger as the angle Θ2 becomes larger. In particular, when the angle Θ2 becomes larger than 45°, the component force Fr becomes larger than the component force FΘ.

TABLE 2

Relationship between the angle Θ2 and the component force

| Angle Θ2 (°) | Magnitude relationship of the component force |
|---|---|
| 0° through 45° | Fr < FΘ |
| 45° | Fr = FΘ |
| 45° through 90° | Fr > FΘ |

In cases in which the angle Θ1 of the free end 44a is 45° or more, by the value of the component force Fr of gravity acting on the toner becoming larger, and the space of wedge shape 46 is disposed at a position where force of the toner entering upstream of contact nip N of the developing roller is stronger, therefore the toner density becomes larger. As a result, in the cases in which the angle Θ1 is 45° or more, the rank of the solid followability is improved by one rank, resulting in the rank A.

On the other hand, in the cases in which the angle Θ1 is negative, as shown in part (c) of FIG. 8, the component force Fr of gravity acting on the toner on the surface of the developing roller 42 acts in the opposite direction to the contact nip N, therefore the toner density in the space of wedge shape 46 becomes smaller. As a result, sufficient density cannot be obtained at the trailing end of the sheet, and it is presumed to result in the images in which image defect can be seen through the visual inspection.

As described above, in the forward direction contact, by configuring the angle Θ of the free end 44a of the regulating blade 44 to be positive, i.e., in a second quadrant, the toner density in the space of wedge shape 46 can be increased. As a result, it becomes possible to obtain the solid image with good solid followability. In particular, by configuring the angle Θ1 to be 45° or more even in the second quadrant, a very good solid image can be obtained.

In addition, as shown in part (a) through part (b) of FIG. 8, in the present Embodiment, the fixed end 44b of the regulating blade 44 is disposed so as to be positioned in the second quadrant of the coordinate system. By disposing the fixed end 44b in this manner, an upper space of the space of wedge shape 46 can be taken wider, therefore it becomes possible to ensure toner powder pressure in the space of wedge shape 46 relatively higher by the weight of the toner. As a result, it becomes possible to further improve the toner density in addition to the effect described above.

Effect of the Position of the Toner Surface on the Solid Followability

Next, effect of the position of the toner surface on the solid followability, which is considered to significantly affect the powder pressure to the surface of the developing roller 42 in the space of wedge shape 46, is examined. By changing a filling amount of the toner in the developing device 40, changing of the position of the toner surface is performed. A toner surface 91 in the description below is, in an attitude in use of the developing device 40, an uppermost surface of the toner accommodated in the developing container.

Figure 9:
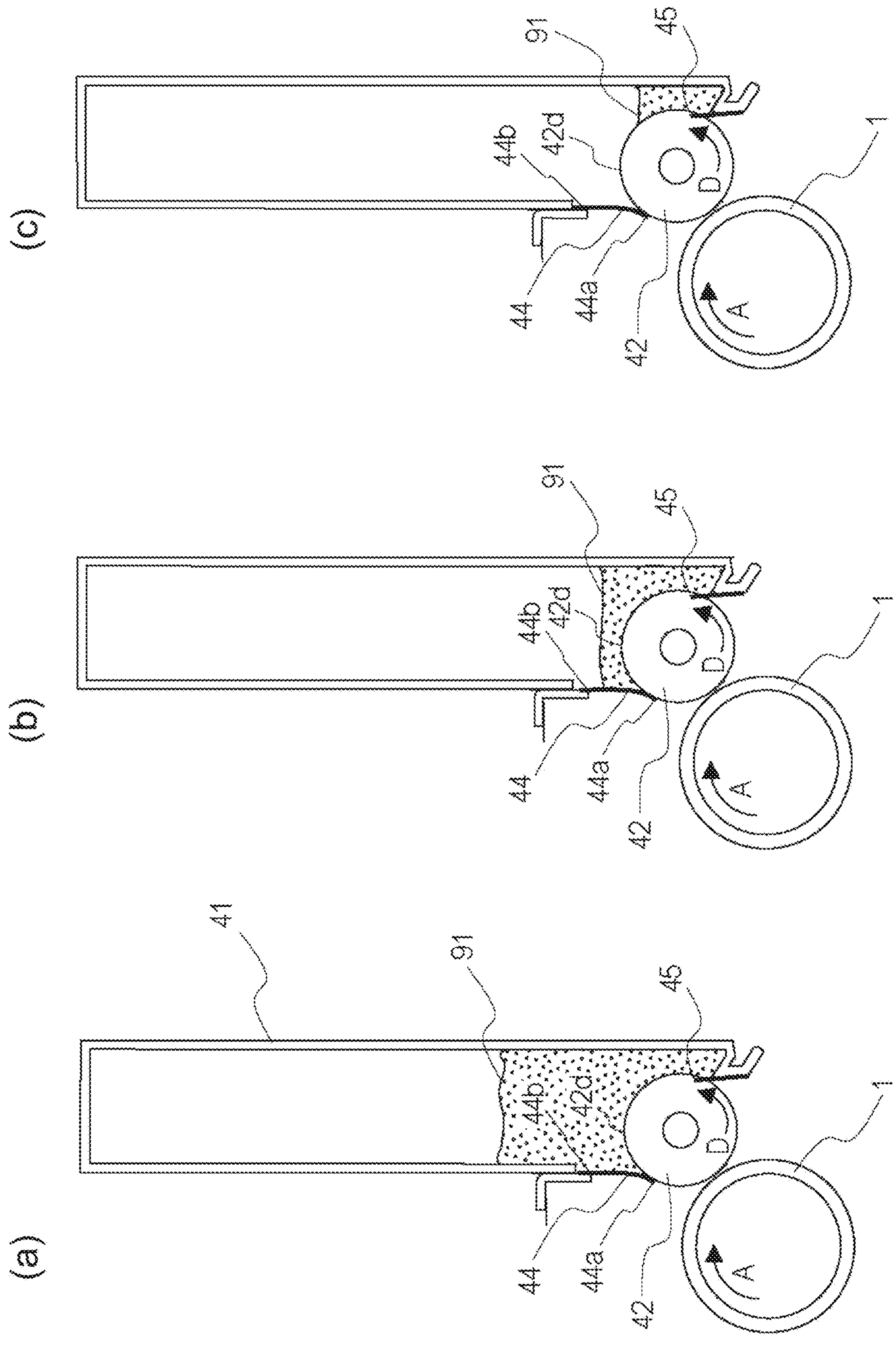
FIG. 9, part (a), part (b) and part (c), includes cross-sectional outline views describing a toner surface in a developing container.

Part (a) of FIG. 9 shows a case of an initial use of the developing device 40 and in which the toner amount accommodated in the developing device 40 is 40 g, and at this time, the toner surface 91 is positioned above the fixed end 44*b* of the regulating blade 44. Part (b) of FIG. 9 shows a case in which the toner amount accommodated in the developing device 40 is 18 g, and the toner surface 91 is positioned above an apex 42*d* of the developing roller 42 and below the fixed end 44*b* of the regulating blade 44. Part (c) of FIG. 9 shows a case of a final use of the developing device 40 and in which the toner amount accommodated in the developing device 40 is 10 g, and the toner surface 91 is positioned below the apex 42*d* of the developing roller 42.

Hereinafter, in Table 3, evaluation results of the solid followability when the toner amounts in the developing device 40 are 40 g, 18 g and 10 g are shown.

TABLE 3

Evaluation results of the solid followability corresponding to respective toner amount accommodated in the developing container

| Toner amount (g) | Rank for the solid followability |
|---|---|
| 40 | A |
| 18 | A |
| 10 | C |

As shown in Table 3, in the case in which the toner amount is 18 g or more, the solid followability is the rank A and a good solid image can be obtained. On the other hand, when the toner amount is less than 18 g, in the solid followability evaluation, sufficient density cannot be obtained at the trailing end of the sheet.

In the case in which the toner amount is 10 g or less, since the toner surface 91 is below the apex 42*d* of the developing roller 42, the toner surface 91 is not present in the second quadrant described in part (a) of FIG. 6. In other words, it can be presumed that since the toner surface 91 is not present in the second quadrant, in which the toner is conveyed by gravity to the space of wedge shape 46, the toner density in the space of wedge shape 46 does not become as large as in part (a) through part (b) of FIG. 9, and the solid followability is deteriorated. Here, with respect to part (c) of FIG. 9 at the final use of the developing device 40, for a solid image with high image density, as shown in the evaluation results in the present embodiment, the image defect, in which the toner supply amount becomes insufficient at the trailing end of the sheet, is seen through the visual inspection. However, there is a case in which quality of image formation may be sufficiently assured under conditions in which image density (printing ratio) is not relatively high.

As described above, by configuring the toner surface 91 to be above the apex of the developing roller 42 and disposing the free end 44*a* of the regulating blade 44 in the second quadrant, the toner density in the space of wedge shape 46 can be increased. In addition, by disposing the fixed end 44*b* of the regulating blade 44 in the second quadrant, it contributes to improvement of the toner powder pressure in the space of wedge shape 46 and it becomes possible to increase the toner density further. As a result, it becomes possible to obtain a uniform solid image with good solid followability.

In the present Embodiment, the developing device 40 constitutes the process cartridge together with the photosensitive drum 1 and is mountable to and demountable from the image forming apparatus 100 as a part of the process cartridge 7. However, the developing device 40 may be constituted as a cartridge, which is separate from the photosensitive drum 1, and may be mountable to and demountable from a main assembly of the image forming apparatus 100. In addition, the developing device 40 may have a configuration of being fixed to the image forming apparatus 100 and in which a user does not mount and demount the developing device 40.

Embodiment 2

Figure 10:
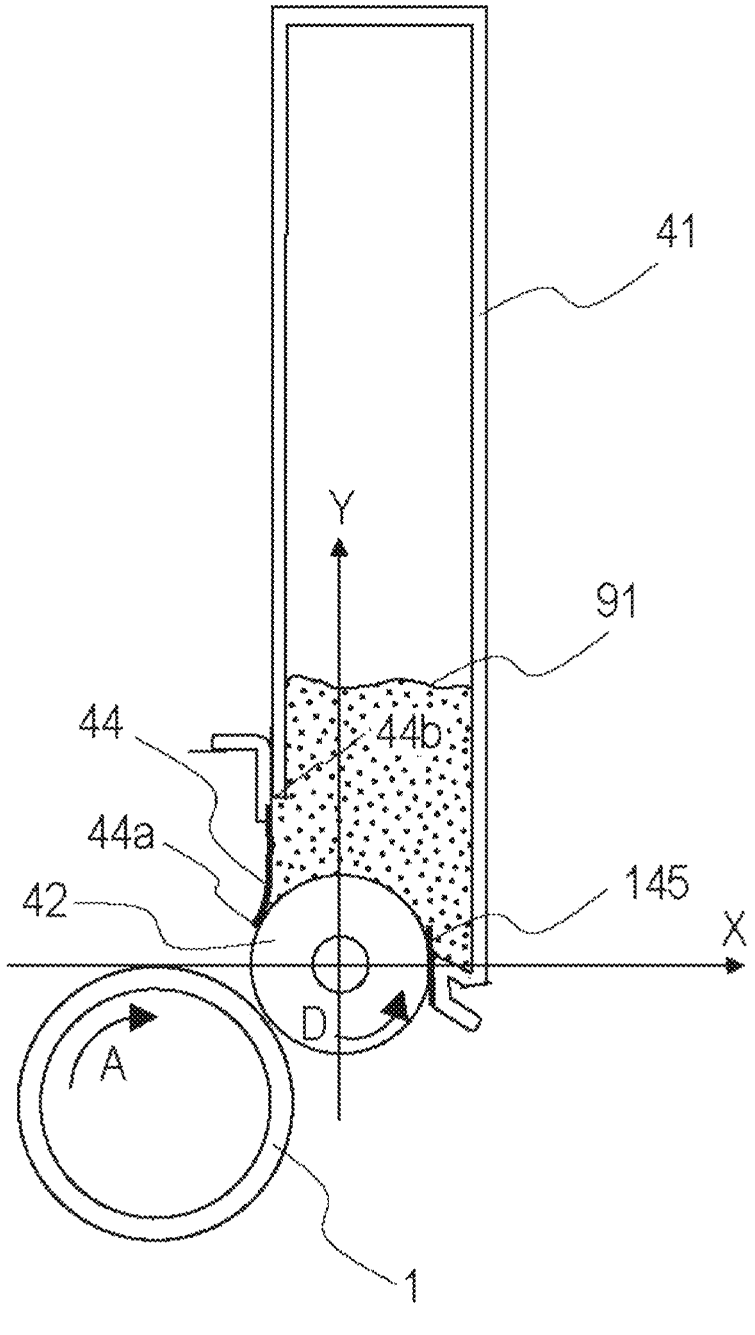
FIG. 10 is a cross-sectional outline view of a process cartridge according to an Embodiment 2.

Hereinafter, an Embodiment 2 will be described using FIG. 10. As shown in FIG. 10, in the Embodiment 2, with respect to the Embodiment 1, except a point that a contact position of a flexible sheet 145 and the developing roller 42 is different, the other configurations are the same as in the Embodiment 1. In the description below, only points which differ from the Embodiment 1 will be described, and for parts in common with Embodiment 1, description will be omitted.

FIG. 10 is a cross-sectional view of a process cartridge 7 in the present Embodiment 2. As shown in FIG. 10, the flexible sheet 145 is configured as one of end portions (one end side) in the short hand direction perpendicular to the longitudinal direction (direction parallel to the rotational axis direction of the developing roller 42) is a fixed end, which is fixed to the frame 41, and the other of the end portions (other end side) opposite side of the one is a free end. An end portion of the free end of the flexible sheet 145 is in contact with the developing roller 42.

In the Embodiment 2, in the same coordinate system as in the Embodiment 1, the contact position between the flexible sheet 145 and the developing roller 42, which is disposed in a fourth quadrant in the Embodiment 1, is disposed in a first quadrant. In this manner, by disposing a tip of the flexible sheet 145 in the first quadrant, it becomes possible to eliminate the toner in the fourth quadrant which does not contribute to the toner density in the space of wedge shape 46. In other words, even with the configuration in the present Embodiment, the same effect as in the Embodiment 1 can be obtained, and in a case in which the toner amount in the developing container is the same amount as the Embodiment 1, it becomes possible to increase the toner density in the space of wedge shape 46 more with the configuration of the Embodiment 2 than with the configuration of the Embodiment 1 even in the final use of the developing device 40. As a result, it becomes possible to improve the solid followability even in the final use of the developing device 40.

Embodiment 3

Figure 11:
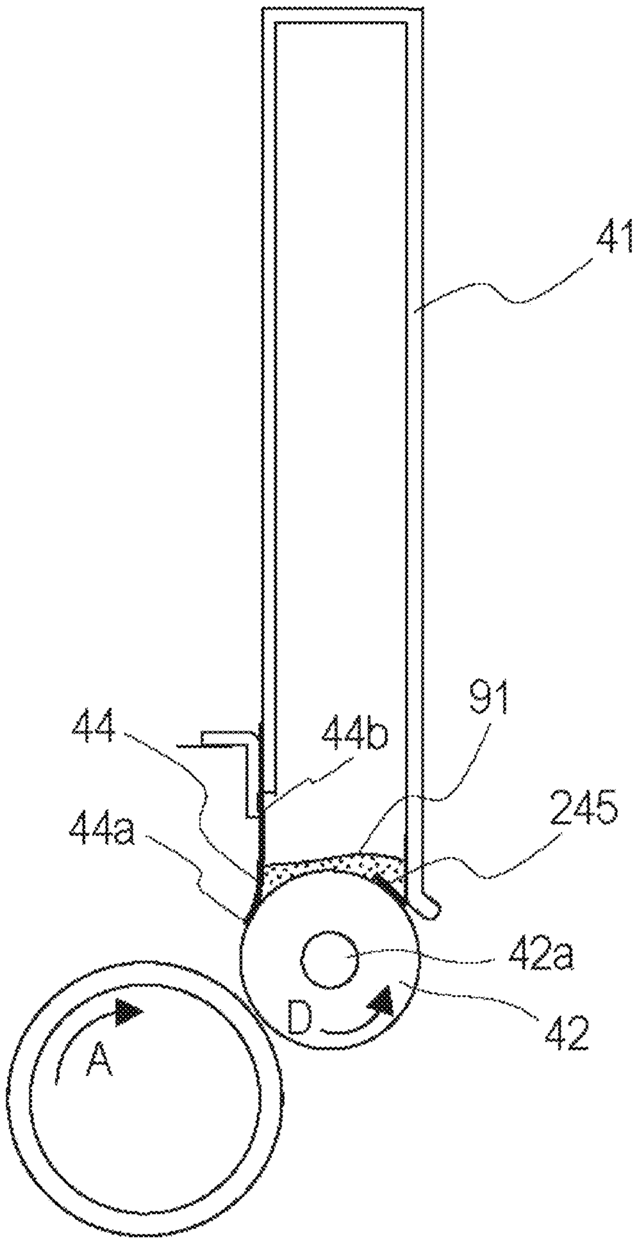
FIG. 11 is a cross-sectional outline view of a process cartridge according to an Embodiment 3.

Hereinafter, an Embodiment 3 will be described using FIG. 11. In the present Embodiment, with respect to the Embodiment 2, a contact position of a flexible sheet 245 to the developing roller 42 is different. In the description below, only the points which differ from the Embodiment 1 and the Embodiment 2 will be described, and for parts in common with the Embodiment 1 or the Embodiment 2, description will be omitted. FIG. 11 is a cross-sectional view of the developing device 40 in the Embodiment 3.

In the present Embodiment, when the toner amount in the developing device 40 becomes small, in order to allow the toner to go to the regulating blade 44 side, the contact position of the flexible sheet 245 is configured to be above the free end 44*a* of the flexible sheet 245.

A toner surface 91 in FIG. 11 shows the toner surface 91 when the toner amount in the developing device 40 is 5 g. In the present Embodiment, even in the case in which the toner amount in the developing device 40 is 5 g, the toner surface 91 can be disposed higher than the apex 42*d* of the developing roller 42. In other words, not only it becomes possible to obtain the same effects as in the Embodiment 1 and the Embodiment 2, but, with respect to the Embodiment 2, it becomes also possible to obtain solid images with better solid followability even more in the final use of the developing device 40.

INDUSTRIAL APPLICABILITY

According to the present invention, it becomes possible to provide a developing device capable of making a developing member carry developer with a simple configuration.

The present Embodiment is not limited to the embodiments described above, and various changes and variations are possible without departing from the spirit and scope of the invention. Accordingly, the following claims are attached to make public the scope of the present invention.

The present application claims priority on the basis of Japanese Patent Application NO. 2022-131522 filed on Aug. 22, 2022, which is hereby incorporated by reference herein in its entirety.

The invention claimed is:

1. A developing device comprising:

a developer carrying member having a surface carrying a developer and that includes a conductive portion and a dielectric portion and capable of carrying the developer by a micro electric field formed on the surface including the conductive portion and the dielectric portion;

a frame to rotatably support the developer carrying member and including a developing container which accommodates the developer; and a regulating member of which one end portion is a fixed end fixed to the frame and of which the other end portion opposite to the one end portion is a free end with respect to a short hand direction perpendicular to a longitudinal direction which is a direction parallel to a rotational axis direction of the developer carrying member, and further comprising no supplying roller configured to supply the developer accommodated in the developing container toward the developer carrying member, wherein the regulating member contacts the developer carrying member in a state in which a tip portion of the free end faces a downstream side in a rotational direction of the developer carrying member and regulates a thickness of a layer of the developer carried on the developer carrying member to a predetermined thickness, and wherein when an axis which passes through a rotation center of the developer carrying member and faces a direction opposite to a direction of gravity is a Y-axis and an axis which passes through the rotation center and rotates the Y-axis by 90° in a clockwise direction is an X-axis, in a coordinate system in which the rotational direction of the developer carrying member is a counterclockwise direction, the tip portion and the fixed end are disposed in a second quadrant of the coordinate system.

2. The developing device according to claim 1, wherein an angle formed by a rectilinear line connecting the tip portion and an origin of the coordinate system and the Y-axis is 45° or more.

3. The developing device according to claim 1, wherein in an initial use state of the developing device and in an attitude in use of the developing device, an uppermost surface of the developer accommodated in the developing container is positioned above the tip portion with respect to the direction of gravity.

4. The developing device according to claim 1, wherein the frame includes an opening portion at a position in which the developer carrying member is provided, and includes a sealing member of which one end is fixed to an end portion of the developing container and of which the other end opposite to the one end is a free end with respect to a direction perpendicular to the longitudinal direction and configured to seal the opening portion at a position corresponding to the opening portion, wherein the sealing member is disposed so that the free end thereof slides the surface of the developer carrying member.

5. The developing device according to claim 4, wherein the free end of the sealing member is arranged in a first quadrant of the coordinate system.

6. The developing device according to claim 5, wherein in an attitude in use of the developing device, the free end of the sealing member is positioned above the tip portion of the regulating member with respect to a direction of gravity.

* * * * *